(12) United States Patent
Kang et al.

(10) Patent No.: US 6,271,857 B1
(45) Date of Patent: Aug. 7, 2001

(54) METHOD OF AND APPARATUS FOR REPRODUCING TEXTURE

(75) Inventors: Dae Im Kang, Taejon; Yon Kyu Park, Seoul; Hou Keun Song, Taejon; Hee Kook Kim; Young Ha Kwon, both of Seoul; Jin Hoon Shon, Taejon, all of (KR)

(73) Assignee: Korea Research Institute of Standards and Science, Taejon (KR)

( * ) Notice: Subject to any disclaimer, the term of this patent is extended or adjusted under 35 U.S.C. 154(b) by 0 days.

(21) Appl. No.: 09/100,969

(22) Filed: Jun. 22, 1998

(30) Foreign Application Priority Data

Apr. 3, 1998 (KR) .................................................. 98-11883

(51) Int. Cl.[7] .................................................. G06T 11/40
(52) U.S. Cl. .............................. 345/430; 66/147; 66/171
(58) Field of Search .............................. 345/430, 31, 108, 345/156, 166, 177; 434/262, 267, 4; 66/62, 64, 125 R, 84 R, 147, 148, 171

(56) References Cited

U.S. PATENT DOCUMENTS

| 5,987,929 | * | 11/1999 | Bostani | .................................. | 66/1 R |
| 6,088,017 | * | 7/2000 | Tremblay et al. | .................... | 345/156 |
| 6,113,395 | * | 9/2000 | Hon | ....................................... | 434/262 |

OTHER PUBLICATIONS

"Vibratory Tactile Display of Image–Based Textures" by Yasushi Ikei, Kazufumi Wakamatsu, and Shuichi Fukuda, pp. 53–61, Apr. 6, 1998.*

Yasushi Ikei et al., "Vibratory Tactile Display of Image Based Textures", IEEE Computer Graphics and Applications, Nov./Dec. 1997, pp. 53–61.

Robert D. Howe et al., "Remote Palpation Technology for Surgical Applications", The IEEE Engineering in Medicine and Biology Magazine, May/Jun. 1995.

* cited by examiner

Primary Examiner—Matthew Luu
Assistant Examiner—Thu-Thao Havan
(74) Attorney, Agent, or Firm—Jacobson Holman, PLLC

(57) ABSTRACT

A method of and an apparatus for reproducing texture, in which a garment product designed by a designer is reproduced using a computer. A visual texture of the product is reproduced by applying the reproduced product to a virtual model, and displaying the virtual model, on which the product is put, on a screen. A tactile texture of the product is also reproduced by driving a tactile texture reproducer based on the surface characteristics, softness and heat transfer coefficient of a fabric to be applied to the product. Based on the reproduced visual and tactile textures, consumers experience the virtual texture of the product through their virtual and tactile senses. Accordingly, it is possible to positively reflect opinions of consumers on products being developed. This makes it possible to develop products having a better chance of market success while reducing the labor, time and costs required in the developments of products.

6 Claims, 4 Drawing Sheets

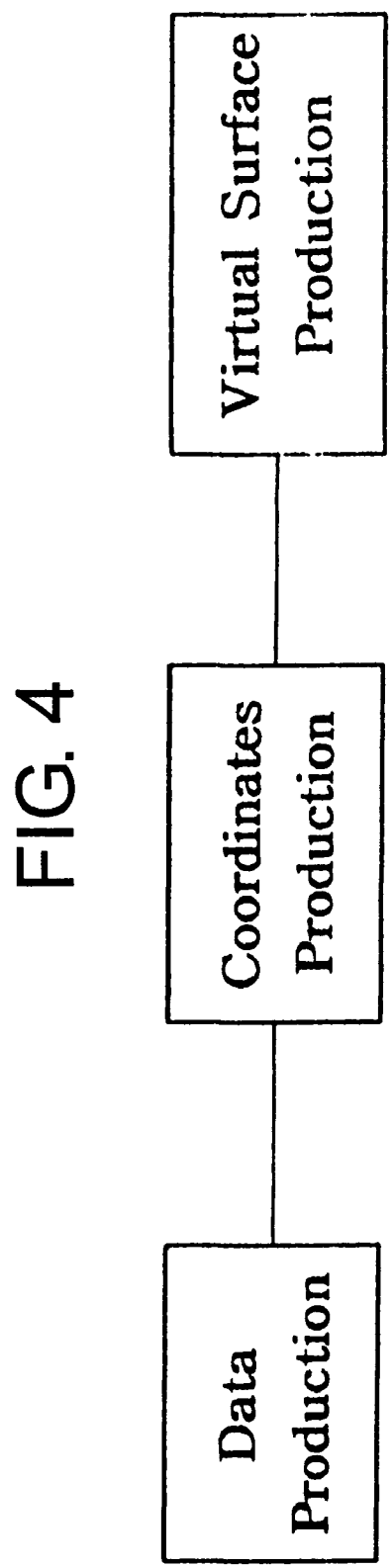

METHOD OF AND APPARATUS FOR REPRODUCING TEXTURE

BACKGROUND OF THE INVENTION

1. Field of the Invention

The present invention relates to a method of and an apparatus for reproducing texture, and more particularly to a texture reproducing method and apparatus for presenting a virtual texture of a product, being developed, to consumers in order to allow the consumers to experience the texture of the product through their visual and tactile senses so that opinions of consumers on the product are positively reflected on developments of products.

2. Description of the Prior Art

Generally, where dress of a new fashion is developed, it is designed and made by only the experience and concepts of designers. The success of this product is determined by the degree of interests of consumers thereon exhibited after the product is put on the market.

If opinions of consumers of products being developed are reflected on those products, it is then possible to develop products having a better chance of market success. It is also possible to reduce the labor, time and costs required in the development of products.

In order to reflect opinions of consumers on products being developed, a method has been proposed in which once the design of clothing is determined by designers, samples of the clothing are made using various kinds of fabric. These samples are shown to consumers so as to obtain opinions of the consumers.

However, this method is impractical because there are a variety of clothes such as winter and summer clothes for gentlemen, winter and summer clothes for women, and clothes for traditional dress. In other words, it is practically impossible to prepare samples of such various clothes for a newly designed product.

In order to solve such a problem, a number of research efforts have been made to reproduce virtual touch. Before making a description of such research efforts, definition of the term "touch" will be made.

Generally, the term "touch" is defined as the term "tactile sensing" and the term "texture". The term "tactile sensing" is mainly used among persons who are engaged in research for robots. The term "tactile sensing" is indicative of a force required to pick up an object. In other words, "tactile sensing" is used as the concept of a grip force. When a robot picks up an object with an excessively large grip force, the object may be damaged. On the other hand, when the grip force of the robot is very slight, the robot may drop the object, thereby causing the object to be damaged. Thus, it is very important to appropriately determine and control a desired grip force where desired operations are carried out using robots.

Meanwhile, the term "texture" is mainly used among persons (Kawabata, Japanese, and et al) who are engaged in research for clothing fabric. They use "texture" by defining this term by the term "hand value". Hand values are determined, based on the touch of fabrics derived from their physical properties such as tensile properties, bending properties, surface properties (surface roughness and frictional characteristics), shear properties, compressive properties, weight, and thickness. The hand value of a cloth is indicative of how much the cloth is appropriate for garments.

In this concept, however, visual texture is excluded. Warmth characteristics, namely, heat transfer characteristics, are also excluded. Moreover, fabrics are determined, based on only their appropriateness for garments, without taking into consideration the feeling and sensibility of human beings.

As an example of results of research associated with the reproduction of "texture", there is a texture display proposed by R. D. Howe and et al (R. D. Howe, W. J. Peine, D. A. Kontarinis and K. S. Son, "Remote Palpation Technology for Surgical Applications", The IEEE Engineering in Medicine and Biology Magazine, 14(3), pp. 318–323, May/June 1995). The texture display proposed by R. D. Howe includes a pin array consisting of 6×4 pins having a distance between pin centers corresponding to 2 mm. In this texture display, a desired shape is reproduced by adjusting the height of each pin. The height adjustment for each pin is carried out by a lever type height adjusting device mounted to each pin. The lever type height adjusting device includes a lever connected to the lower end of an associated pin, a shape memory alloy wire, and a spring.

However, such a texture display is adapted to provide tactile sensing information about the surface of an affected part of a patient, which is obtained by a probe inserted into the human body of the patient, to a surgeon. Furthermore, there is a limitation in reproducing fine texture due to an inferior spatial resolution corresponding to 2 mm.

As another example of results of research associated with the reproduction of "texture", there is a texture display proposed by Y. Ikei and et al (Y. Ikei, K. Wakamatsu and S. Fukuda, "Vibratory Tactile display of Image-Based Texture", IEEE Computer Graphics and Applications, pp. 53–61, November/December 1997). Similar to the above mentioned texture display, this texture display uses a pin array. This pin array consists of 10×5 pins having a distance between pin centers corresponding to 2 mm. In this texture display, a photographic image of an object to be displayed is first obtained and then subjected to a shading process, thereby determining the brightness at portions thereof respectively corresponding to the pins. Based on the determined brightness, each pin is adjusted in its vibration amplitude. Thus, a surface profile of the object is reproduced. In this case, vibrations are applied to each pin by a piezoelectric actuator. The vibration frequency of the piezoelectric actuator is fixed to 250 Hz.

However, this texture display also has a limitation in reproducing the texture of a fine surface due to an inferior spatial resolution thereof. To this end, it is necessary to develop a new texture display with a high spatial resolution enabling a texture reproduction other than a profile reproduction.

SUMMARY OF THE INVENTION

Therefore, the present invention has been made in view of the above mentioned problems, and an object of the invention is to provide a method of and an apparatus for reproducing texture, wherein a virtual texture of a product being developed is reproduced for a selected cloth using a screen and a tactile texture reproducer having a high spatial resolution, based on data about the selected cloth obtained from a database, in which data about a variety of fabrics is constructed, so that consumers experience the virtual texture of the product through their virtual and tactile senses.

In accordance with one aspect, the present invention provides a texture reproducing method comprising the steps of: a) reproducing a garment product, designed by a designer, using a computer; b) applying the reproduced product to a virtual model; c) displaying the virtual model, on which the product is put, on a screen, thereby reproducing a visual texture of the product; d) producing coordinate data, based on the surface characteristics, softness and heat transfer coefficient of a fabric to be applied to the product; e) moving a piezoelectric actuator provided with a probe to a desired position, based on the produced coordinate data; and f) axially moving wires of a surface reproducer by the probe of the piezoelectric actuator moved to a desired position, thereby reproducing a virtual fabric surface, so that a tactile texture of the product is reproduced.

In accordance with another aspect, the present invention provides a texture reproducing apparatus comprising: a surface reproducer consisting of a plurality of axially movable wires; a piezoelectric actuator provided with a probe adapted to axially move a selected one of the wires while coming into contact with an end of the selected wire; an X-Y actuator having two degrees of freedom and serving to move the piezoelectric actuator in X-Y directions; and a Z-drive link adapted to move the piezoelectric actuator in a Z direction, thereby causing the probe to come into contact with the end of the selected wire and to move axially.

BRIEF DESCRIPTION OF THE DRAWINGS

Other objects and aspects of the invention will become apparent from the following description of embodiments with reference to the accompanying drawings in which:

FIG. 4 is a flow chart illustrating sequential operations of the tactile texture reproducing apparatus shown in FIG. 2.

DESCRIPTION OF THE PREFERRED EMBODIMENTS

Prior to a description of the preferred embodiments of the present invention, a definition of terms used in the present invention will be made.

The term "texture" used in the present invention means the sensation of a person when he touches or sees a fabric. Such a texture is used as a reference for the feeling or sensibility of human beings for determining whether or not an optional fabric is appropriate for a specific garment or whether the garment made of an optional fabric looks smart.

In other words, "texture" is defined as a tactile texture and a visual texture in accordance with the present invention. The tactile texture of a fabric is determined, based on the surface characteristics (surface roughness and frictional characteristics) of the fabric, compliance (or the inverse of hardness) and heat transfer coefficient. On the other hand, the visual texture of a fabric is determined, based on the visual feeling or sensibility of a person who puts on a garment made of the fabric.

The determined texture is used to evaluate whether or not the associated fabric is appropriate for garments. This evaluation is based on the sensibility of a person who puts on a garment made of the fabric. The sensibility is indicative of whether or not the garment looks smart, sexy, deluxe, or soft.

Now, the present invention will be described in conjunction with a preferred embodiment in which the texture, defined as visual and tactile textures, of a product being developed is presented to consumers in order to allow the consumers to experience the virtual texture of the product through their visual and tactile senses.

Figure 1:
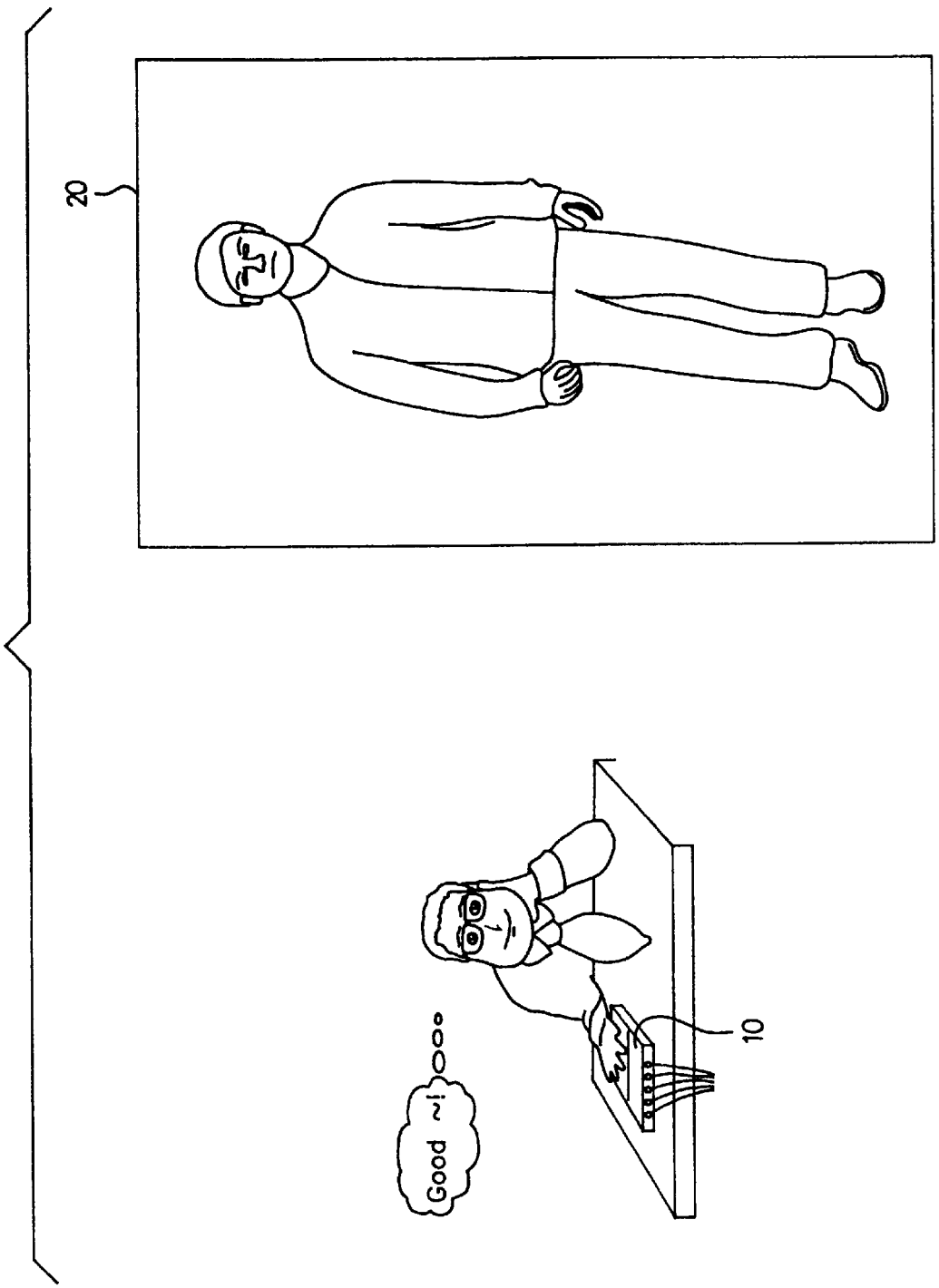
FIG. 1 is a view for explaining the concept of a texture reproducing method according to the present invention.

FIG. 1 is a view for explaining the concept of a texture reproducing method according to the present invention. In accordance with this texture reproducing method of the present invention, when a designer designs a new garment, this garment is reproduced using a computer. The reproduced garment is then displayed on a screen 20 while being put on a virtual model. Accordingly, consumers can view the virtual model displayed on the screen 20, thereby experiencing the visual texture of the product being developed. That is, consumers can determine whether or not the garment put on the model looks smart, sexy, deluxe, or soft.

Meanwhile, when the designer selects an appropriate fabric for the new design, a tactile texture reproducing apparatus 10, which will be described hereinafter, provides a virtual fabric corresponding to the selected fabric to consumers. In other words, the tactile texture reproducing apparatus 10 reproduces the virtual fabric, based on a variety of data about the properties of various fabrics, collected through an experimental device, such as surface characteristics (surface roughness and frictional characteristics), compliance (or the inverse of hardness), and heat transfer coefficient. From the reproduced virtual fabric, consumers are allowed to experience the tactile texture of the product being developed.

In order to evaluate the texture of a product being developed, an evaluation method may be used in which the tactile and visual textures of the product are independently reproduced and evaluated. In this case, the results of the independent evaluations are combined. Alternatively, an evaluation method may be used in which the tactile and visual textures of the product are simultaneously reproduced and evaluated. In the case in which the tactile and visual textures of the product are independently reproduced and evaluated, it is necessary to make a careful discussion about the interaction between the tactile and visual textures.

Figure 2:
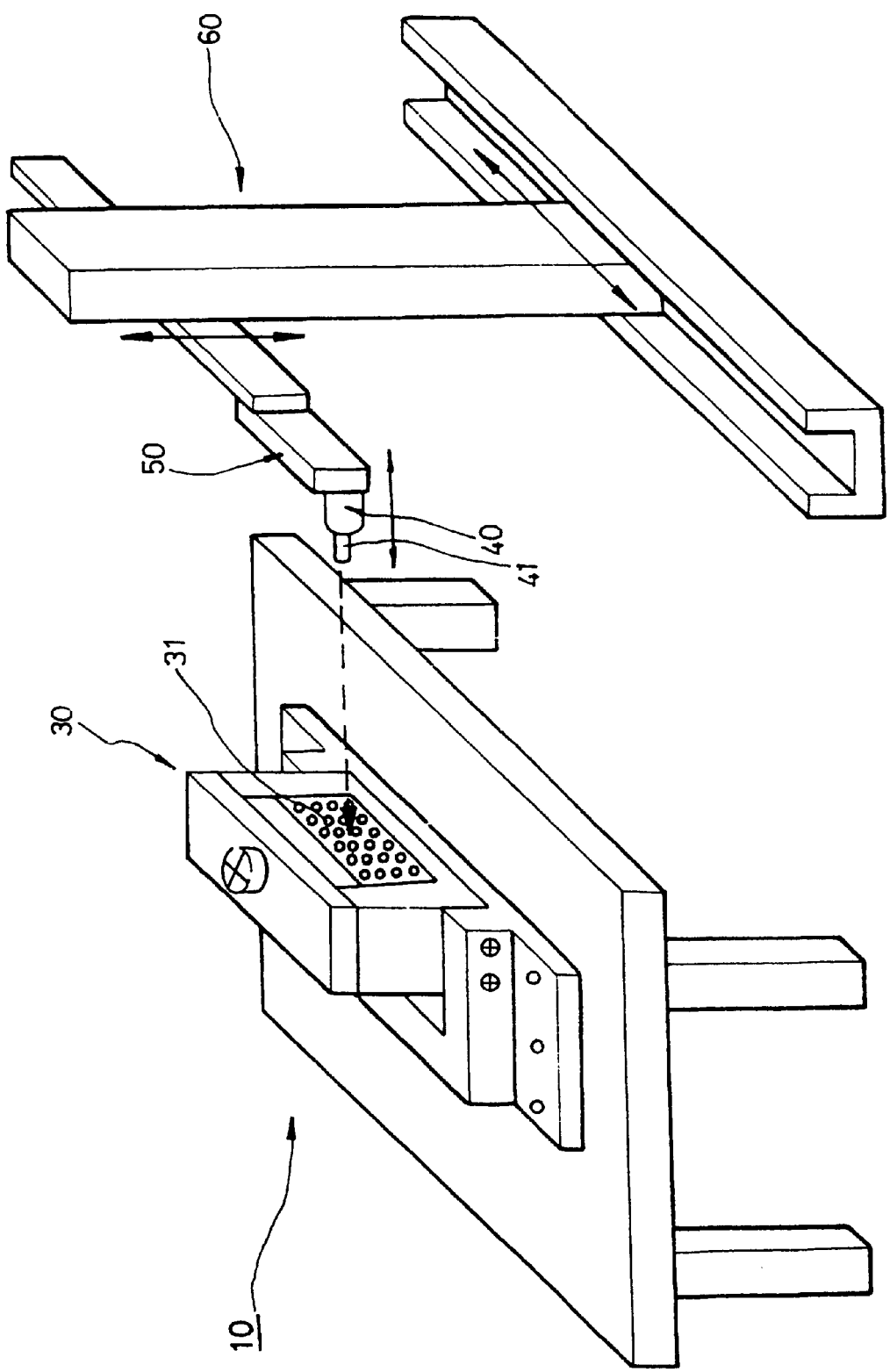
FIG. 2 is a perspective view schematically illustrating a tactile texture reproducing apparatus according to the present invention.
Figure 3:
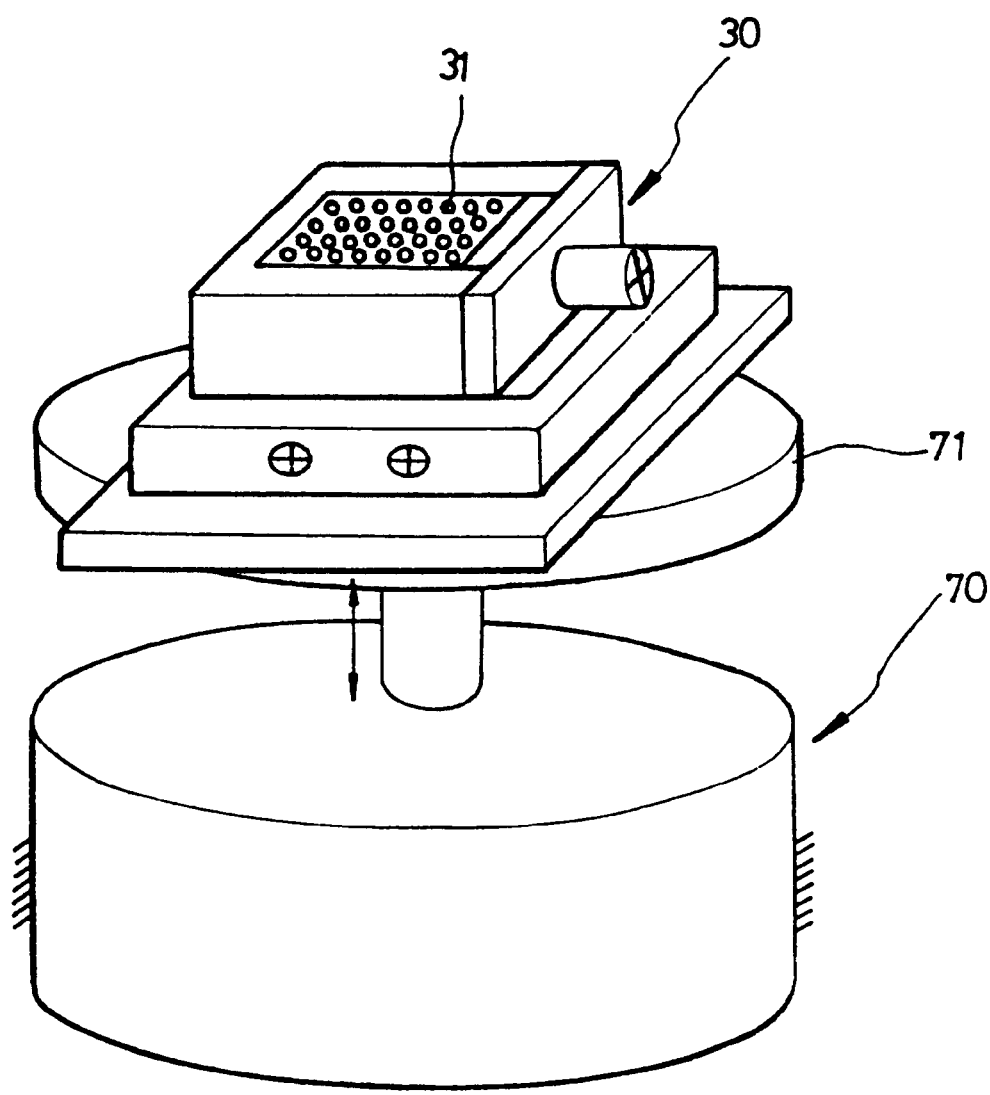
FIG. 3 is a perspective view schematically illustrating the tactile texture reproducing apparatus of FIG. 2 in a state in which its surface reproducing part is mounted to a compliance reproducer.

FIG. 2 is a perspective view schematically illustrating the tactile texture reproducing apparatus 10 which appropriately combines together the properties of various fabrics collected through an experimental device and constructed in the form of a database, thereby providing a desired virtual fabric to consumers. FIG. 3 is a perspective view schematically illustrating the tactile texture reproducing apparatus 10 of FIG. 2 in a state in which its surface reproducing part is mounted to a compliance reproducer 70.

In accordance with the present invention, a bundle of wires are used to reproduce the surface of a virtual fabric. That is, the tactile texture reproducing apparatus 10 includes a surface reproducer 30 consisting of a bundle of fine wires 31. When the wires 31 move axially, a surface having a desired profile is produced. Of course, the precision of the produced surface depends on the diameter and strength of each wire 31 and the finished state of each wire 31 at opposite ends thereof.

The tactile texture reproducing apparatus 10 also includes a piezoelectric actuator 40 which serves as a drive actuator for axially moving each of the wires 31. The piezoelectric actuator 40 has a probe pin 41 fixedly mounted to one end of the piezoelectric actuator 40. The probe pin 41 comes into contact with a desired one of the wires 31, thereby axially moving the wire 31. In order to achieve easy movements, the wires 31 may be slidably received in separate guides, respectively.

The piezoelectric actuator 40 is coupled at the other end thereof to an X-Y actuator 60 which has two degrees of freedom in X-Y directions. Accordingly, the piezoelectric actuator 40 can move to a desired position by the X-Y actuator 60. The piezoelectric actuator 40 is also connected to a Z-drive link 50. The probe 41 comes into contact with a desired one of the wires 31, thereby axially moving the wire 31.

In accordance with the present invention, when an appropriate fabric is selected for a new product by a designer, coordinate data is generated from the tactile texture reproducing apparatus 10, based on the properties of the selected fabric collected in the form of a database. Based on the generated coordinate data, the X-Y actuator 60 and Z-drive link 50 move. Accordingly, the piezoelectric actuator 40 moves to a desired position and then comes into contact with a desired one of the wires 31, thereby axially moving the wire 31. Thus, a virtual fabric having surface characteristics corresponding to those of the selected fabric is reproduced so that it is presented to consumers. After a completion of axial movements of desired wires 31, the entire bundle of wires 31 is clamped to fix the wires 31, thereby preventing the wires 31 from moving when a consumer touches the wires 31.

The diameter of the wires 31 has a direct influence on the spatial resolution for reproducing a virtual surface. The tactile texture reproducing apparatus 10 of the present invention provides a superior spatial resolution as compared to conventional tactile display devices respectively proposed by R. D. Howe and Y. Ikei to use a pin array consisting of pins having a distance between pin centers corresponding to 2 mm. For example, where a virtual surface is reproduced for an area of 3 cm×3 cm using wires having a diameter of 0.2 mm in accordance with the present invention, 150×150 wires are used. In this case, a spatial resolution corresponding to 0.2 mm is obtained.

In the conventional tactile display devices proposed by R. D. Howe and Y. Ikei, there is a limitation in using an increased number of wires to achieve an improvement in spatial resolution because it is impossible to attach additional actuators to those additional pins. In accordance with the present invention, however, it is possible to use an increased number of wires without any limitation because movements of all wires are achieved using a single actuator or a small number of actuators.

Meanwhile, the frictional characteristics of a reproduced virtual fabric may be adjusted for some kinds of fabrics by applying a coating material to an end of each wire to be touched by consumers. It is also possible to adjust the warmth characteristics of the virtual fabric by applying heat of an appropriate temperature to the end of each wire to be touched by consumers. Thus, the present invention presents a virtual fabric corresponding to a fabric selected by a designer to consumers through the tactile texture reproducing apparatus 10.

Even in the present invention, it is impossible to reproduce a very fine surface such as a precisely-finished metal surface, due to a limitation in the diameter of the wires 31. In order to compensate for such a limitation, the tactile texture reproducing apparatus 10 of the present invention includes the compliance reproducer 70. This compliance reproducer 70 has a movable plate 71 on which the surface reproducer 30 is laid. The movable plate 71 vibrates at an appropriate amplitude and frequency, thereby causing the wires 31 to vibrate appropriately.

By vibrating the wires 31 of the surface reproducer 10 as mentioned above, it is possible to reproduce a texture identical to that experienced by a person when he touches an actual surface, even though the virtual surface reproduced in accordance with the present invention has a smoothness lower than that exhibited in the actual surface. In other words, it is possible to provide a virtual fabric surface identical to the actual surface of a fabric experienced by a person while being physically different from the actual fabric surface, by appropriately combining together the surface characteristics, compliance (or the inverse of hardness), and heat transfer coefficient all given for the actual fabric.

Although the surface reproducer 30, drive actuators 50 and 60, and compliance reproducer 70 are configured in a separate manner in the above mentioned embodiment, they may have an integral configuration. In this case, it is possible to more efficiently provide a virtual texture, as will be appreciate to skilled persons in the fields to which the present invention pertains.

Although the present invention has been described in conjunction with the preferred embodiment for reproducing virtual textures of fabrics, it may also be applied to other products such as leather products, furniture, and electric appliances, etc. In other words, the present invention is applicable to the cases in which it is necessary to determine the texture of a product, based on a combination of the tactile and visual textures experienced by consumers.

As apparent from the above description, the present invention provides a method of and an apparatus for reproducing a texture, wherein a virtual texture of a product being developed is reproduced for a selected fabric using a screen and a tactile texture reproducer having a high spatial resolution, based on data about the selected fabric obtained from a database, in which data about a variety of fabrics is constructed, so that consumers experience the virtual texture of the product through their virtual and tactile senses. In accordance with the present invention, it is possible to positively reflect opinions of consumers on products being developed. Accordingly, it is possible to develop products having a better chance of market success while reducing the labor, time and costs required in the developments of products.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A texture reproducing method comprising the steps of:
   a) reproducing a garment product, designed by a designer, using a computer;
   b) applying the reproduced product to a virtual model;
   c) displaying the virtual model, on which the product is put, on a screen, thereby reproducing a visual texture of the product;
   d) producing coordinate data, based on the surface characteristics, softness and heat transfer coefficient of a fabric to be applied to the product;
   e) moving a piezoelectric actuator provided with a probe to a desired position, based on the produced coordinate data;
   f) axially moving each selected wire of a bundle of wires of a surface reproducer by the probe of the piezoelectric actuator to a desired position repeatedly until moving of all of the wires are completed, thereby reproducing a virtual fabric surface, so that a tactile texture of the product is reproduced;

g) clamping the bundle of wires for preventing the bundle of wires from moving; and h) vibrating the surface reproducer as a whole at a desired amplitude and frequency.

2. A texture reproducing apparatus comprising:

a surface reproducer consisting of a bundle of wires, each wire being axially movable;

a piezoelectric actuator provided with a probe adapted to axially move a selected wire of the bundle of wires while coming into contact with an end of the selected wire;

an X-Y actuator having two degrees of freedom and serving to move the piezoelectric actuator in X-Y directions;

a Z-drive link adapted to move the piezoelectric actuator in a Z direction, thereby causing the probe to come into contact with the end of the selected wire and to move axially; and a compliance reproducer adapted to vibrate the surface reproducer as a whole at a desired amplitude and frequency.

3. The texture reproducing apparatus according to claim 2, further comprising:

a heating unit adapted to apply heat of a desired temperature to an end of each of the wires, which is touched by a person, thereby adjusting the warmth characteristics of a virtual fabric reproduced.

4. The texture reproducing apparatus according to claim 2, wherein an end of each of the wires, which is touched by a person, is coated with a coating material, thereby adjusting the frictional characteristics of a virtual fabric reproduced.

5. The texture reproducing apparatus according to claim 2, wherein the wires are slidably received in guides, respectively.

6. The texture reproducing apparatus according to claim 2, wherein both the X-Y actuator and the Z-drive link move the piezoelectric actuator, based on coordinate data produced in accordance with the surface characteristics, softness and heat transfer coefficient given for a fabric selected.

* * * * *